(12) United States Patent
Ehrfeld et al.

(10) Patent No.: US 6,256,429 B1
(45) Date of Patent: Jul. 3, 2001

(54) MATRIX SWITCH

(75) Inventors: Wolfgang Ehrfeld, Mainz; Heinz Lehr, Berlin; Antoni Picard, Eltville, all of (DE)

(73) Assignee: Institut fur Mikrotechnik Mainz GmbH, Mainz (DE)

( * ) Notice: Subject to any disclaimer, the term of this patent is extended or adjusted under 35 U.S.C. 154(b) by 0 days.

(21) Appl. No.: 09/402,151
(22) PCT Filed: Mar. 27, 1998
(86) PCT No.: PCT/EP98/01808
§ 371 Date: Sep. 29, 1999
§ 102(e) Date: Sep. 29, 1999
(87) PCT Pub. No.: WO98/44377
PCT Pub. Date: Oct. 8, 1998

(30) Foreign Application Priority Data

Apr. 2, 1997 (DE) .............................. 197 13 630

(51) Int. Cl.$^7$ ...................................... G02B 6/26
(52) U.S. Cl. .................. 385/17; 385/16; 385/25
(58) Field of Search ................. 385/15, 16, 17, 385/25, 31, 65, 72; 359/251, 320

(56) References Cited

U.S. PATENT DOCUMENTS

| | | | |
|---|---|---|---|
| 4,955,686 | 9/1990 | Buhrer et al. | 385/17 |
| 5,050,955 | * 9/1991 | Sjolinder | 385/17 |
| 5,299,054 | * 3/1994 | Geiger | 359/251 |
| 5,796,884 | * 8/1998 | Wingo | 385/16 |
| 5,841,917 | * 11/1998 | Jungerman et al. | 385/17 |
| 6,058,228 | * 5/2000 | Fasanella et al. | 385/17 |

FOREIGN PATENT DOCUMENTS

| | | |
|---|---|---|
| 0 567 143 A1 | 10/1993 | (EP) . |
| WO 91/10150 | 7/1991 | (WO) . |

\* cited by examiner

Primary Examiner—Loha Ben
(74) Attorney, Agent, or Firm—Hudak & Shunk Co., L.P.A.

(57) ABSTRACT

The invention relates to a matrix switch for optical fibers, exhibiting slides (S1(n)) arranged in lines, to each of which an input optical fiber (LWL1(n)) is fixed, and slides (S2(m)) arranged in columns to each of which an output optical fiber (LWL2(m)) is fixed. The slides with the optical fibers are arranged on two planes in such a way that the input optical fibers can be optically coupled to the output optical fibers by displacing the output and input slides. A device (1) with stops (2) arranged in lines and columns is provided to position the slides (S1(n)), (S21(m)) to which the input or output optical fibers (LWL1(n)), (LWL1(n)) are fixed. The positioning device (1) enables the advancement of the output slides (S2(m)) to be limited in such a way that the output slides are secured in an exact position in which the input optical fibers can be coupled to the output optical fibers. The input and/or output slides are fitted with stops which are arranged in such a way that the input or output slides are secured in a position in which the input are exactly aligned with the output optical fibers. The matrix switch for optical fibers has a simple, compact design. It enables high-precision optical fiber connection involving relatively low switching times.

10 Claims, 7 Drawing Sheets

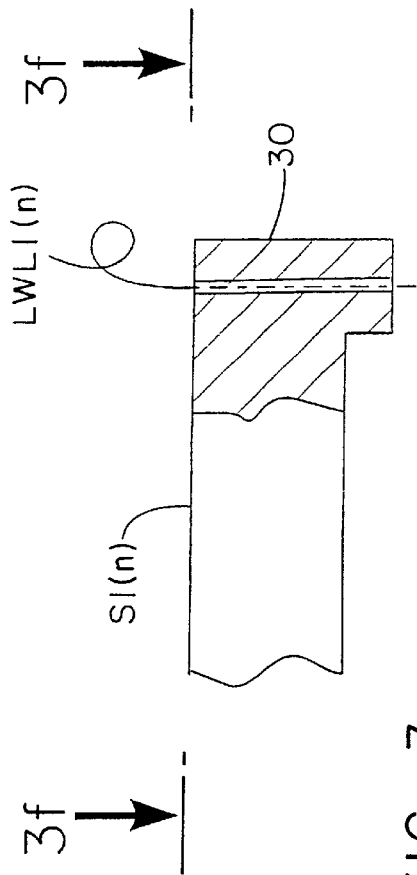
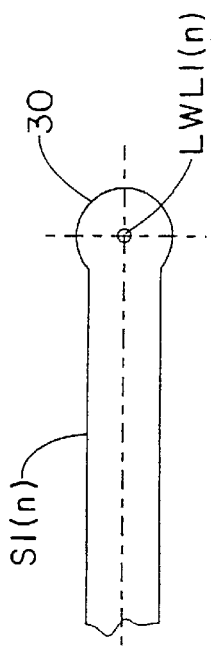
FIG.-3e
FIG.-3f
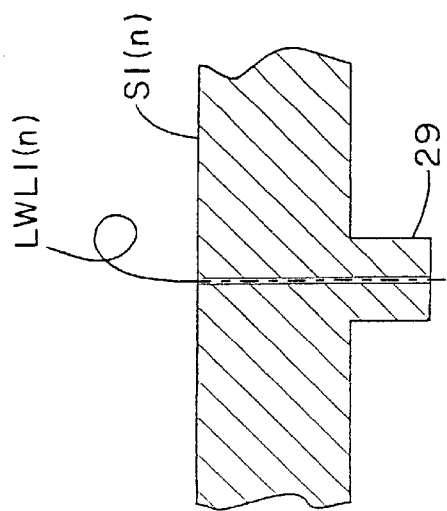
FIG.-3d

MATRIX SWITCH

BACKGROUND OF THE INVENTION

The invention concerns a matrix switch for optical fibers.

For connecting optical fiber conductors, matrix switches are known with which N optical input channels can be switched at will to M optical output channels. The number of the glass fibers to be switched depends on the particular field of application. In the field of telecommunications, matrix switches with a multiplicity of input and output channels are used.

Mechanical matrix switches are known in which mirrors or prisms are moved with great precision. Switches based on arrangements of mirrors or prisms require a very stable, precise construction. In particular an accurate movement of the microoptical components is necessary. The precision required for acceptable optical attenuation values is generally associated with high technological costs.

In a known system for switching optical glass fiber conductors, the fibers are aligned with each other whereby XYZ manipulators connect single or multiple plugs with each other. While an effective and stable connection between the glass fibers is thereby established, the joining of glass fibers via plugs makes a large mechanical expense and expensive control mechanisms necessary in order to ensure exactness of adjustment for the plug insertion procedure.

The known thermooptical matrix switches make sense only for small N×M arrangements since the losses are great and production is expensive.

SUMMARY OF THE INVENTION

The object of the invention is to create a matrix switch for optical fibers which has a relatively simple and compact construction and allows switching of the optical fibers with high precision and relatively short switch times.

The solution of this object takes place according to the invention with the features of the appended claims.

The following assignment of the concepts "input" and "output" serves only to describe the geometrical arrangement. Each optical fiber is able to transport an input signal and/or (bi-directional) an output signal. Also the terms "rows" and "columns" are to be understood such that the input and output slides are arranged exactly at right angles to each other. The sole decisive factor is that the slides on their tracks cross each other.

The slides which can be displaced in the direction of the row and columns, preferably have an elongated shape and can, for example, be configured as bars or rods.

For positioning the slides to which the input and output optical fibers are fastened, an arrangement of stops is provided in the rows and columns. This positioning arrangement allows the advance path of the slides on the output side to be limited so that they are fastened precisely in the position in which the input optical fibers can be connected to the optical fibers of the output slides.

In addition, the input and/or output slides have stops which are arranged such that the input or output slides are fastened in the position in which the input optical connector is precisely aligned with the output optical fiber.

According to the specifications of a certain switching procedure through the positioning arrangement, the optical fibers can be switched through the output slides being advanced to the stops of the positioning arrangement. To this end the positioning arrangement is advantageously arranged in the end range of the output slides. In this may, the coupling position is precisely fixed. Step motors or the like with which a certain advance path can be specified are not necessary.

However, it is also conceivable for the positioning arrangement not to be arranged in the end range but rather below the output slides, for example in the area where the coupling of the optical fibers takes place. For this purpose, the output slides advantageously have additional stops which project into the plane of the stops of the positioning arrangement, by which means the advance of these slides can be limited.

In a preferred embodiment, the stops of the input or output slides are configured as stop elements with complementary partial contours which serve for the fine adjustment of the slides. Since the partial contours of the stops mesh, the matrix switch is largely insensitive to jarring. Even if the input slides should not be precisely aligned with the output slides the latter are brought through the partial contours, even if they are offset to one side, into a position in which the input optical fibers are aligned precisely with the output optical fibers.

The stop elements of the input slides preferably have a U- or V-shaped contour and the stop elements of the output slides have a corresponding U- or V-shaped groove. For stop elements of the input slides, circular or semicircular contours are also conceivable which fit into corresponding U-shaped grooves. The side flanks of the groove form guide surfaces for the stop elements of the input slides.

In a further preferred embodiment form, the ends of the input and output optical fibers are arranged in fiber holders with the same exterior contour whereby the fiber holders of the output optical fibers are arranged in channel-shaped depressions of stops projecting into the plane of the input slides. The fiber holders of the output optical fibers are arranged in the channel-shaped depressions of the stops such that the section of the groove which projects into the plane of the input slides, receives the fiber holders of the input optical fibers. Since both the input optical fibers and the output optical fibers are positioned by the same groove structure, the glass fibers are aligned with each other optimally.

Preferably the stops are a one-piece component of the slides. Thus, for example, projections which receive the optical fibers can be configured on the slides. The stops, however, can also be formed by the fiber holders themselves.

In an advantageous configuration, the stops of the input and/or output slides are spring-mounted to the slides to dampen the impact on coupling. In the static condition, the force of these springs between slides and stop is equal to the force with which the input slide presses against the output slide.

As a result of the stops spring-mounted to the slides, the stops can yield to the centering forces acting transversely to the advance direction of the slides. A simple centering is also possible, however, if the slides themselves have a certain flexibility or are moved in such manner that slight lateral movements are possible.

The positioning arrangement advantageously has electromagnetic, thermoelectrical, piezoelectric, or pneumatic drive elements for activation of the stops. With the drive elements, the stops can be switched back and forth between two bistable positions, i.e., overlapping into the advance path of the slides or out of the advance path. Here the precision of movement is of no significance for the switching performance of the matrix. Bolts, pins, plates, or the like can be used, by way of example, as stops.

The number of drive elements which are required for activating the slide is advantageously reduced in that the slides are spring-loaded in the switch position. The spring elements have the advantage that the slides interlock with a defined initial tension. In this advantageous embodiment form, selectable drive elements need be provided only for withdrawal of the slide into the starting position.

If the slides are spring-loaded, in theory only one input and one output drive element are necessary whereby the two drive elements activate all input and output slides. The two drive elements for the input and the output side can, for example, be configured as comb-like rakes or cylinders which catch corresponding engagement elements such as hooks or teeth on the tracks. While this embodiment form has a particularly simple design, it is disadvantageous however, that all connections must be undone for reconfiguration.

If only the coupling regions which are to be switched are to be loosened, the contact elements can be configured such that they can be switched between a position in which they are engaged with the drive elements and a position in which they are out of contact with the drive elements. The contact elements can be arranged on the slides or on the yokes. Since only relatively small requirements are placed on the activating mechanism of the contact elements with respect to precision, they can be realized at a favorable cost.

The optical coupling of optical fibers can take place via an open beam whereby appropriate lens systems can be utilized to improve the coupling efficiency if needed. The optical coupling of optical fibers can likewise take place through a sufficiently small gap so that beam-forming elements can be omitted whereby the gap between the ends of the fibers can be completely filled by a liquid which is adapted to the refraction index of the optical fibers. A further possibility for improving the coupling is represented by the use of special fibers with an expanded core (TEC) which are distinguished by an extremely small numerical aperture, i.e., without additional optics, emit the light signal in an almost parallel beam. In addition, coupling is possible through physical contact of the optical fiber ends. An additional movement of an optical fiber or conductors is advantageously provided axially to the orientation of the fiber to avoid damage to the ends upon making of contact. The light signal is conducted directly from the input fiber into the output fiber without an open beam expanse. To prevent the ends of the fibers from sliding against each other and thereby being destroyed, a higher degree of precision is required in this case.

The matrix switch according to the invention has compact construction whereby coupling losses and crosstalk are slight. Switching times are in the range of <1 sec. The arrangement is therefore especially suited to constructing reconfigurable distributor systems. The area of application extends to functions within buildings, for example Intranet, computer systems, and for the interconnecting of fibers in external switch boxes and fiber shafts for telecommunications, for example for the configuration of subscriber lines.

BRIEF DESCRIPTION OF THE DRAWINGS

Cost effective micro techniques, in particular the LIGA technique can be used for producing the precision parts.

Several exemplary embodiments of the invention are explained in greater detail with the help of the drawings.

FIG. 3d shows an embodiment form of a slide with a stop located on its lower side, FIGS. 3e,f show a slide with a stop on its face surface.

DETAILED DESCRIPTION OF THE INVENTION

Figure 1:
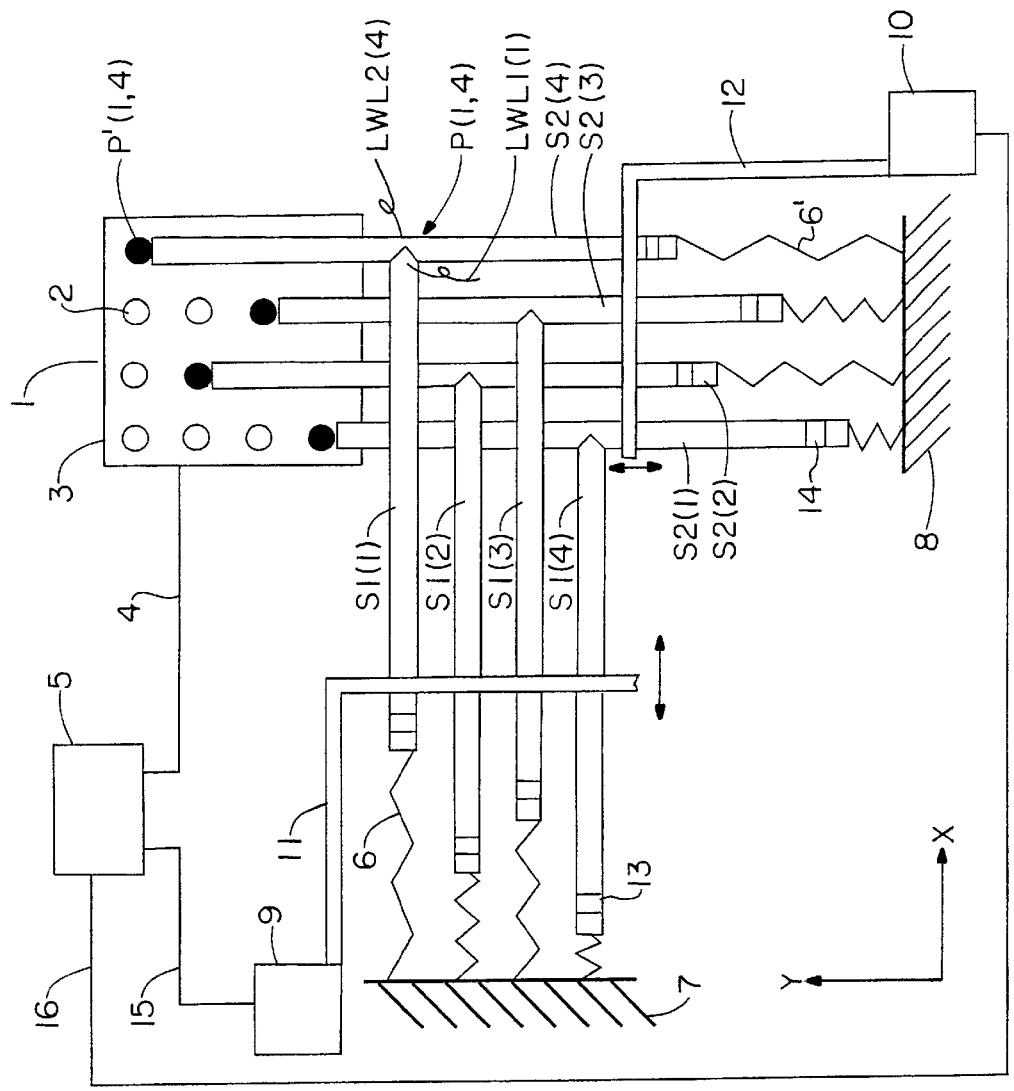
FIG. 1 shows an embodiment form of the matrix switch in schematic representation.
Figure 2:
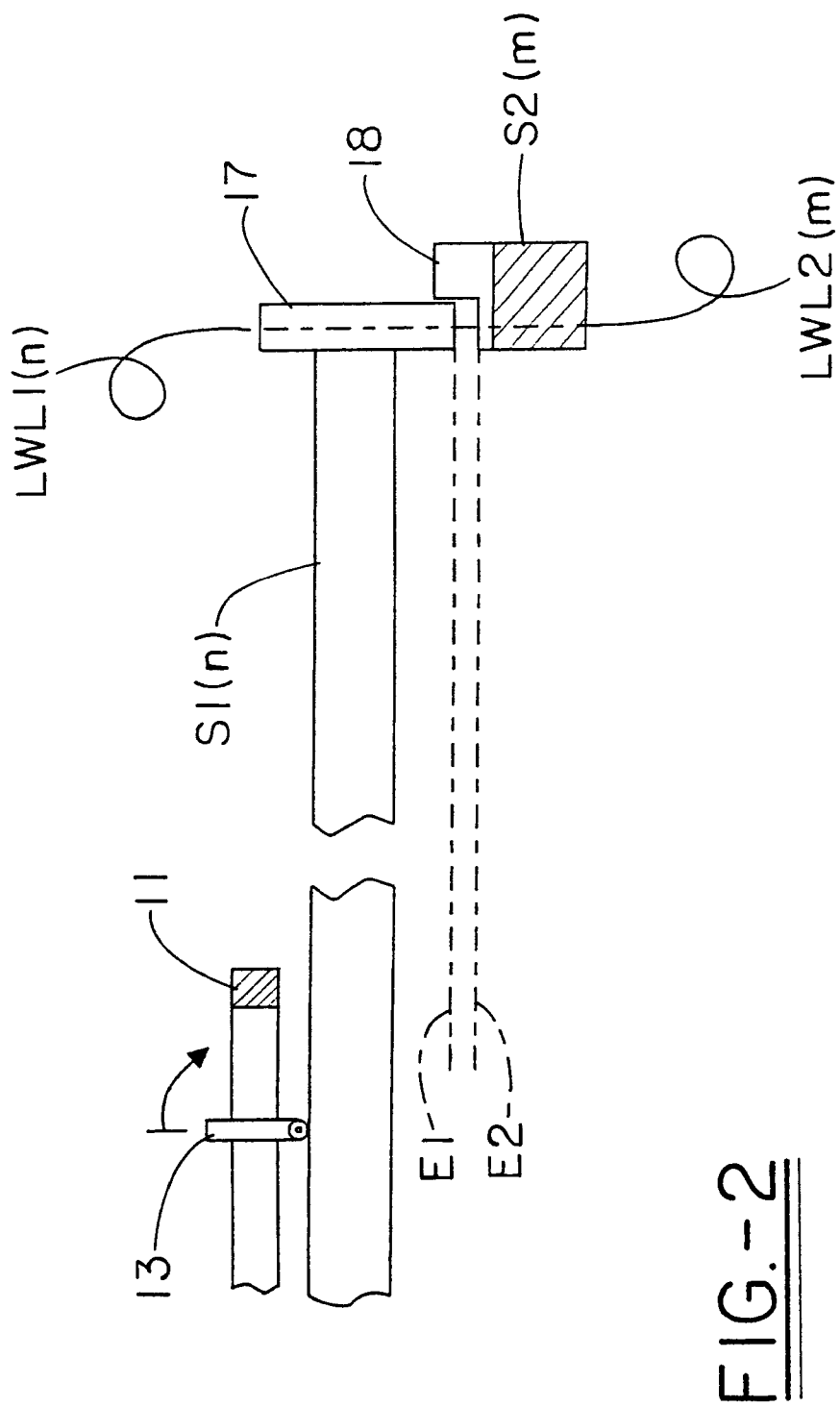
FIG. 2 shows a partial view of the matrix switch from FIG. 1.

FIG. 1 shows a matrix switch for switching N input fibers and M output fibers in schematic representation. The N input fibers LWL1(n) with [n=1 . . . N] are fixed to rod-shaped slides S1(n) with [n=1 . . . N] which are arranged parallel to each other in one plane $E_1$ at equal intervals and which can be shifted in the longitudinal direction, i.e., in the direction of the X axis. The M output fibers LWL2(m) with [m=1 . . . M] are fixed to rod-shaped slides S2(m) with [m=1 . . . M] which are arranged parallel to each other in a plane $E_2$ at equal intervals and which can be shifted in longitudinal direction, i.e., in the direction of the Y axis. The input and output fibers are fixed to the input and output slides so that their ends are aligned with each other through shifting of the slides and thus the input fibers can be coupled with the output fibers (FIG. 2). The matrix switch has N×M coupling sites (n*, m*) which are distributed in the manner of a matrix in the XY plane.

For precise positioning of the output slides S2(m) with the output fibers LWL2(m), a positioning arrangement 1 is arranged for the output slide with N×M stops which form an N×M matrix of the same size as the N×M matrix of coupling sites P(n*, m*). Stops 2 of positioning arrangement 1 are bolts which are carried in an aperture plate 3 transverse to the longitudinal direction of the output slide S2(m) so as to be capable of being shifted. An electromagnetic drive element, which is arranged below aperture plate 3 and is not depicted in FIG. 1, is assigned to each bolt.

The electromagnet drive elements of bolts 2 are configured such that the bolts can be shifted into a blocking position in which they project out from aperture plate 3 and into a release position in which they are lowered into the aperture plate. In FIG. 1, the bolts 2, which are in blocking position, are represented as dots and the bolts in release position are represented as circles. The drive elements for activation of bolts 2 are connected via a control wire 4 to a central control unit 5 which specifies the switch positions P'(n*, m*).

Input slides S1(n) are spring-loaded in the direction of the output slides, i.e., in the direction of the X axis by means of compression springs 6 which on one side are fastened to a stationary body 7 and on the other side to the ends of the slide S1(n). The output slides S2(m) are likewise spring-loaded in the direction of the positioning arrangement 1, i.e., in the direction of the Y axis, by means of compression springs 6', which are fastened on one side to a stationary body 8 and on the other to the ends of the slides.

Here the positioning arrangement is arranged in the terminal area of the output slides. The positioning arrangement, however, can also be located below the output slides, for which purpose the output slides have additional stops which project into the plane of the bolts in blocking position. Such an arrangement would be even more compact than the arrangement depicted.

It can be advantageous to dampen the return speed generated by the compression springs. For this purpose, the tracks can be arranged in an oil bath, for example, or may be provided with appropriate braking structures. The oil bath can at the same time serve as an index-matching liquid.

For withdrawal of the slides S1(n) and/or S2(m) against the spring tension, an input servomotor 9 and/or output servomotor 10 is provided which drives a strap 11, 12 extending transverse to the feed direction of the slides which acts with contact elements 13, 14 which are arranged on the slides. If the straps 11 and/or 12 are drawn back into the initial position, they catch the contact elements 13 or 14 of the slides and carry the slides along. The input and output servomotors 9, 10 are connected to the central control unit 5 via control wires 15, 16.

In order for it to be possible to loosen only a few of the coupling sites P(n*,m*), catch elements 13, 14 are configured as folding hooks which can be switched by means of not-depicted electromagnetic drive elements between a release position in which they lie flat against the slides and a drive position in which they are caught by the straps 11, 12 of the servomotors 9, 10 (FIG. 2).

The ends of the input fibers LWL1(n) are situated in ferrules 17 which are fastened to the input slides S1(n) such that the light-emitting ends of the output fibers are in the input plane $E_1$. Ferrules refer to holders for optical fibers. The ends of the output fibers LWL2(m) are placed in output slides S2(m) such that the light-admitting ends of the output fibers are in the output plane $E_2$ (FIG. 2). Because planes $E_1$ and $E_2$ are between the upper edge and the lower edge of the output and input tracks, reconfiguring of individual slides is possible without their being hindered by tracks which remain in their position. The output slides in addition to the light-admitting ends of the output fibers in the output plane $E_2$ have projecting stops 18 for the ferrules 17 of the input fibers LWL1(n) which themselves form stops so that the light-emitting ends of the input fibers in the switch position are aligned precisely with the light-admitting ends of the output fibers.

By way of example, a switching action can be carried out as follows. First folding hooks 13, 14 of input and output slides S1(n) and S2(m), respectively, are folded out into the catch position and the servomotors 9, 10 are started in order to withdraw the input and output slides via straps 11, 12 into the starting position. Then the drive elements of stops 2 of positioning arrangement 1 are activated in order to configure the stops according to the desired switch position P(n*,m*). Now folding hooks 14 of output slides S2(m) are folded down into the release position so that the slides can be advanced by the force of compression springs 6' far enough that they contact stops 2 of positioning arrangement 1. Now hooks 13 of input slides S1(n) are folded down into the release position so that the input slides are advanced through the force of compression springs 6' far enough that stops 17 of the input slides contact stops 18 of the output slides. Thus input fibers LWL1(n) are aligned precisely with output fibers LWL2(m). To end the switch condition, hooks 13, 14 of the slides are folded out again and the slides are withdrawn again into their initial position. If hooks 13, 14 of the slides are folded out only individually, the connections can also be broken selectively.

FIGS. 3a through 3f show different embodiments of the stops of the slides. For fine adjustment of the slides at the coupling sites P(n*,m*), the stops of the input and output slides S1(n) and S2(m), respectively, have complementary partial contours.

Figure 3B:
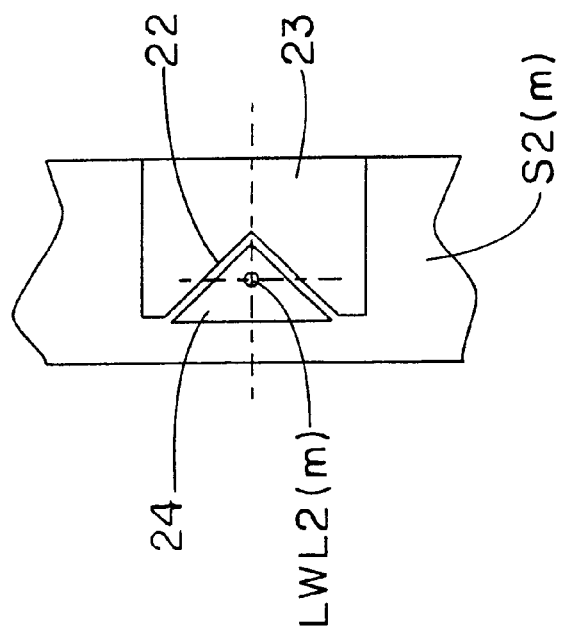
FIG. 3b shows an embodiment form of the input and output slides the stops of which have V-shaped partial contours.
Figure 3A:
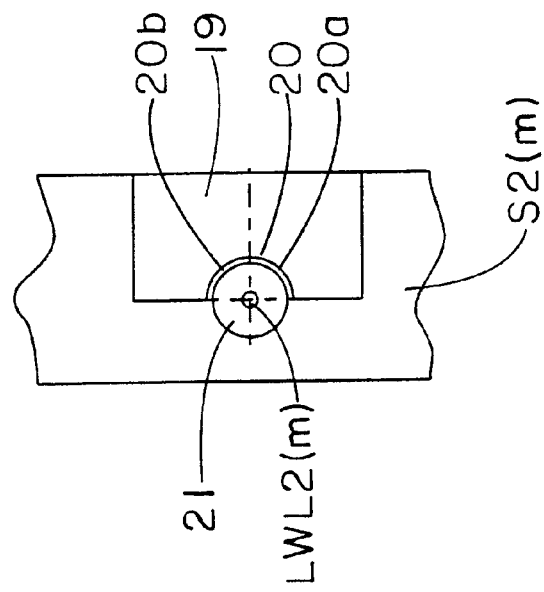
FIG. 3a shows an embodiment form of the input and output slides, the stops of which have U-shaped partial contours.

In the embodiment depicted in FIG. 3a, stop 19 of an output slide S2(m) has a half-cup-shaped or essentially U-shaped groove 20 while stop element 21 of an input slide S1(n) has a circular cross section so that the lateral flanks 20a, 20b of groove 20 form guide surfaces for the input stop element 21.

The exemplary embodiment shown in FIG. 3b differs from the embodiment described with reference to FIG. 3a in that groove 22 of output stop element 23 is V-shaped, while input stop element 24 has a triangular cross section so that it fits in the groove.

Figure 3C:
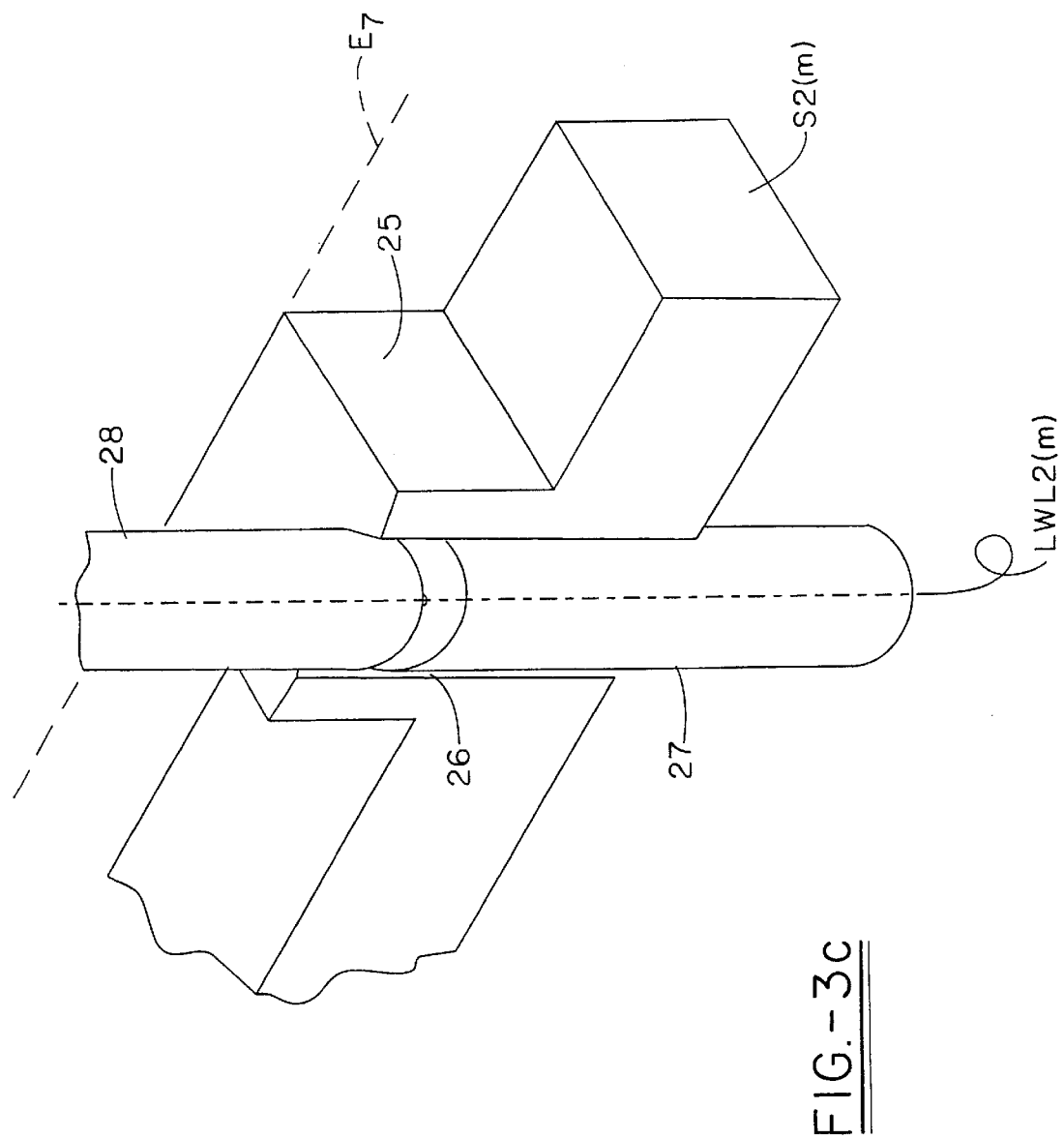
FIG. 3c shows an embodiment form of the input and output slides in which the fiber holders of the input and output fibers are positioned in a channel-shaped structure of the output slides.

FIG. 3c shows an embodiment in which output and input fibers LWL1(n) and LWL2(m), respectively, are centered in the same structure. The not-depicted output side slide S2(m) has a stop element 25 which projects into input plane $E_1$ and has a channel-shaped structure in the form of a V-shaped groove 26 which is an integral component of the slide. In groove 26, ferrules 27 of output fibers LWL2(m) are fastened. Input fibers LWL1(n) have a ferrule 28 of the same type as the output fibers and is fastened in the input slide S1(n) such that upon the advance of the slide it is pressed into the open section of groove 26. Since the same groove structure aligns both the input fibers and the output fibers, the input and output fibers are precisely positioned.

FIG. 3d shows an exemplary embodiment in which input stop element 29 with input fiber LWL1(n) is configured as a peg which is arranged on the underside of the slide and is an integral component of the slide. FIG. 3e shows an embodiment in which stop element 30 together with input fiber LWL1(n) is fastened to the face side of slide S1(n). In FIG. 3f, the top view of slide S1(n) is depicted.

Figure 3G:
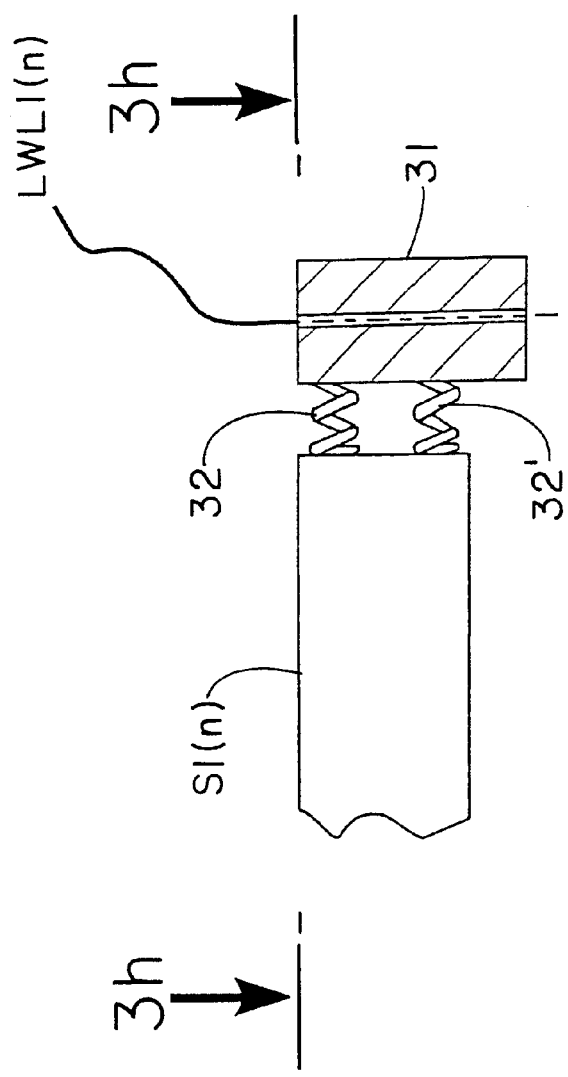
FIGS. 3g–i show embodiment forms of a slide with a stop spring-mounted to its face surface.
Figure 3H:
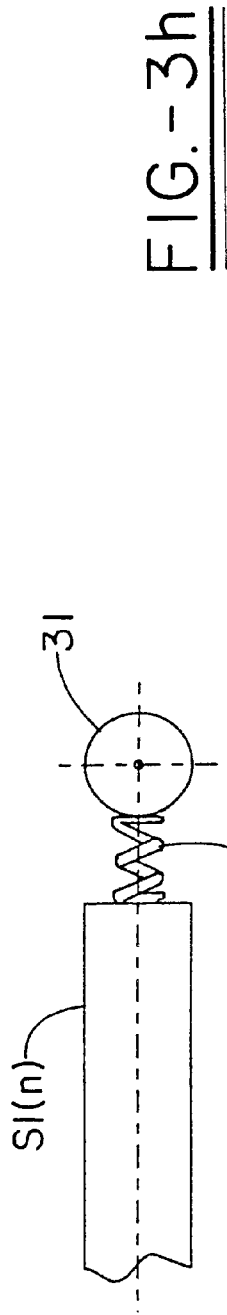

In order to moderate the force of impact of slide S1(n) on striking against slide S2(m) and to compensate for a lateral displacement, stop element 31 can also be spring-mounted. FIGS. 3g and 3h show in lateral and top views an input slide S1(n) in which the stop element 31 which receives input fiber LWL1(n) is fastened to the face side of slide S1(n) by means of two compression springs 32, 32'.

Figure 3I:
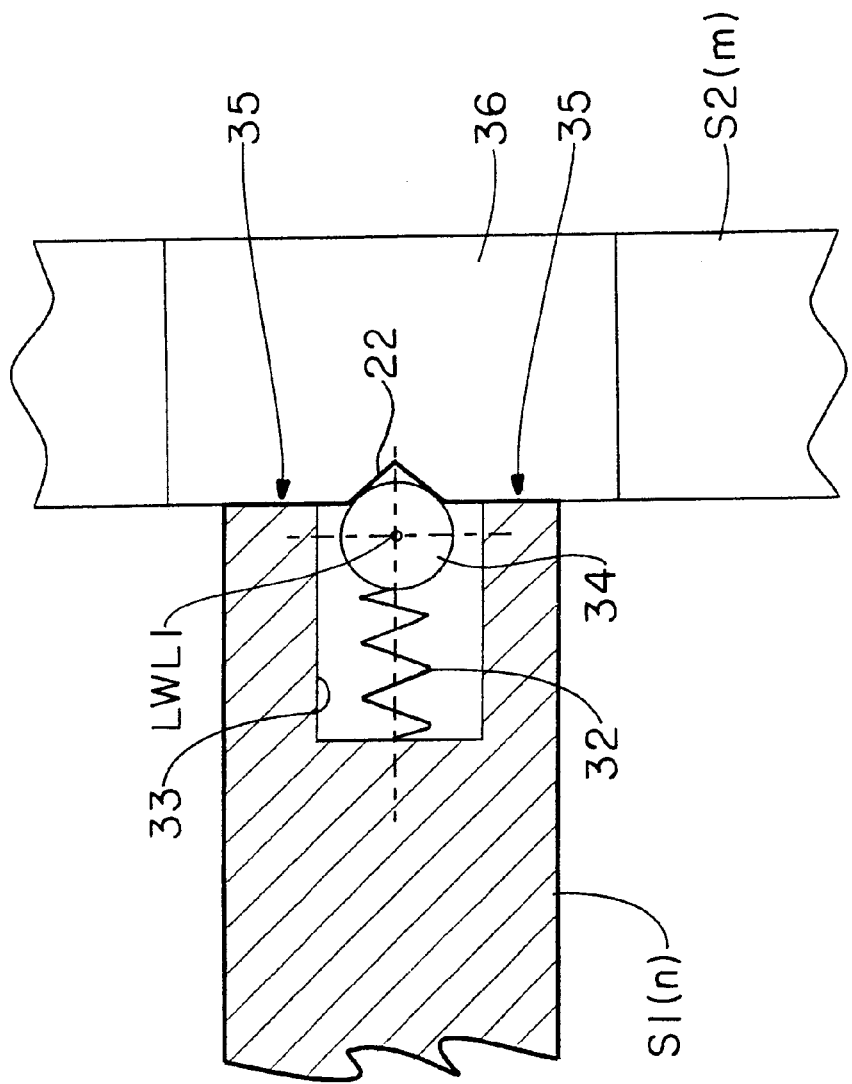

In FIG. 3i, slide S1(n) is provided with a cutout 33 at its face side in which springs 32, 32' (not depicted) are arranged which bear the ferrule 34 with the optical fiber LWL1(n). Output slide S2(m) has a V-shaped groove 22 in its stop element 36 into which ferrule 34 engages upon coupling. In this process, ferrule 34 is pushed back into the recess against the force of spring 32 so far that the face 35 of input slide S1(n) lies against stop element 36. The force of spring 32 is smaller than the force with which the face side 35 of slide S1(n) is pressed against slide S2(m).

Ferrules or fiber holders with stop structures can be omitted if fibers with protective coatings or bare fibers of resistant material, for example plastic, are used. Through the above-described controls of the forces which occur in coupling, damage to the optical fibers can effectively be avoided.

What is claimed:

1. Matrix switch for optical fibers with:
   slides (S1(n)) arranged in rows on each of which an input optical fiber (LWL1(n)) is attached,
   slides (S2(m)) arranged in columns on each of which an output optical fiber (LWL2(m)) is attached,
   a device (9–12) for advancing and withdrawing the input slides (S1(n)) along the rows and the output slides (S2(m)) along the columns, whereby the slides with the optical fibers are arranged in two planes $E_1$, $E_2$ such that the input optical fibers can be optically coupled to the output optical fibers through shifting the input and output slides, characterized in that a positioning arrangement (1) with stops (2) arranged in rows and columns is provided, each of which can be shifted into the plane $E_1$ or plane $E_2$ of the slides (S1(n)) and (S2(m)), respectively, so that the shift path of the slides can be limited and that the input and/or output slides (S1(n), S2(m)) have stops (17,18; 19,21) which are arranged so that the input slides can be shifted against the output slides to couple the optical fibers.

2. Matrix switch for optical fibers according to claim 1 characterized in that the stops (17, 18; 19, 21) of the input and output slides (S1(n), S2(m)) have complementary partial contours.

3. Matrix switch for optical fibers according to claim 2 characterized in that the stops (21) of the input slides (S1(n)) each have a U- or V-shaped, circular, or semicircular contour and the stops (19) of the output slide S2(m)) each have a U- or V-shaped groove.

4. Matrix switch according to claim 2 characterized in that the ends of the input and output optical fibers (LWL1(n), LWL2(m)) are arranged in fiber holders (27, 28) with the same exterior contour, that the fiber holders (27) of the output optical fibers are arranged in channel-shaped structures (26) of stops (25) of the output slides (S2(m)) projecting into the plane $E_1$ of the input slides (S1(n)), and that the fiber holders (28) of the input optical fibers are arranged such that they can be slid into the channel-shaped structures (26) of the stops (25) for coupling of the optical fibers.

5. Matrix switch according to claim 1 characterized in that the stops (18, 29, 30) of the input and/or output slides (S1(n), S2(m)) are an integral component of the slides.

6. Matrix switch according to claim 1 characterized in that the stops (31, 34) of the input and/or output slides (S1(n), S2(m)) are spring-mounted to the slides.

7. Matrix switch according to claim 1 characterized in that the positioning arrangement (1) has drive elements for activating the stops (2).

8. Matrix switch according to claim 1 characterized in that the device (9–12) for advancing and withdrawing the slides (S1(n), S2(m)) has spring elements (6,6') for advancing the slides into the switch position and drive elements for withdrawing the slides into the initial position.

9. Matrix switch according to claim 8 characterized in that the spring and drive elements of the device (9–12) for advancing and withdrawing the slides have straps which extend transverse to the advance direction of the slides and can be shifted in the advance direction of the slides and that the slides have contact elements (13, 14) which are arranged such that they are caught by the straps (11, 12) when the latter are withdrawn.

10. Matrix switch according to claims 9 characterized in that the contact elements (13, 14) of the slides (S1(n), S2(m)) can be switched between a release position in which they lie flat against the slides and a catch position in which they are caught by the straps (11, 12).

* * * * *